Feb. 9, 1954

E. BERKLEGE 2,668,459

POWER LOAD EQUALIZER

Filed Nov. 29, 1949

INVENTOR.
EMIL BERKLEGE

BY Hyde, Meyer, Baldwin & Doran

ATTORNEYS

Feb. 9, 1954

E. BERKLEGE 2,668,459

POWER LOAD EQUALIZER

Filed Nov. 29, 1949

INVENTOR.
EMIL BERKLEGE
BY
Hyde, Meyer, Baldwin & Doran
ATTORNEYS

Feb. 9, 1954 — E. BERKLEGE — 2,668,459
POWER LOAD EQUALIZER
Filed Nov. 29, 1949 — 5 Sheets-Sheet 3

INVENTOR.
EMIL BERKLEGE

Feb. 9, 1954        E. BERKLEGE        2,668,459

POWER LOAD EQUALIZER

Filed Nov. 29, 1949        5 Sheets-Sheet 4

INVENTOR.
EMIL BERKLEGE

BY

*Hyde, Meyer, Baldwin & Doran*

ATTORNEYS

Feb. 9, 1954
E. BERKLEGE
2,668,459
POWER LOAD EQUALIZER
Filed Nov. 29, 1949
5 Sheets-Sheet 5
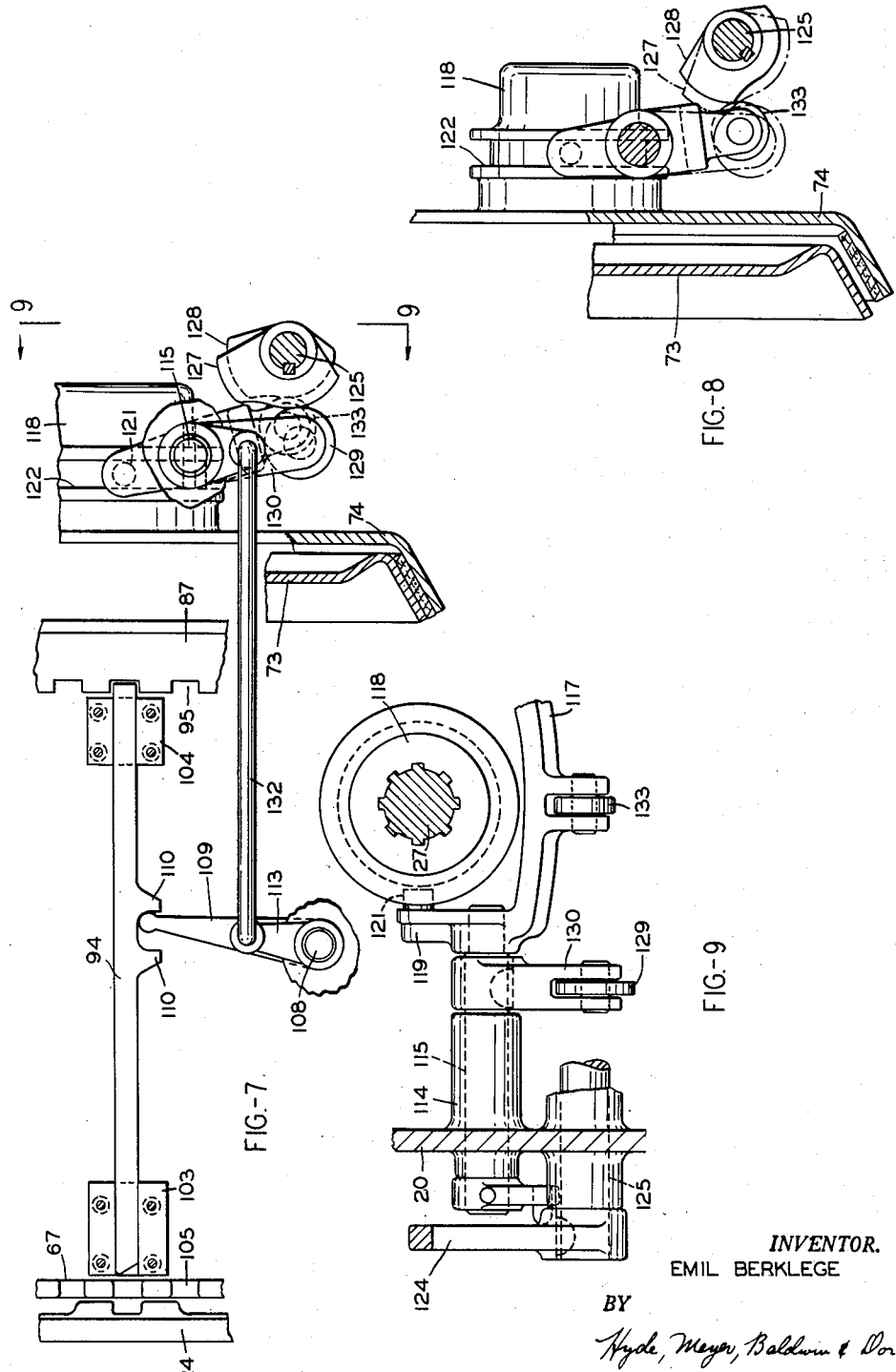
INVENTOR.
EMIL BERKLEGE
BY
Hyde, Meyer, Baldwin & Doran
ATTORNEYS Patented Feb. 9, 1954

2,668,459

UNITED STATES PATENT OFFICE 2,668,459

POWER LOAD EQUALIZER

Emil Berklege, Cleveland Heights, Ohio

Application November 29, 1949, Serial No. 129,992

18 Claims. (Cl. 74—751)

The invention relates to novel and improved devices for the transmission of power, supplied in the form of rotary motion, from a driving member to a driven member.

An object of the present invention is to provide means for the transmission of power as aforesaid in such manner as to produce an infinitely variable torque, automatically controlled in response to the requirements of the load or in response to the variations in power in the input.

A further object of the invention is to transmit power as aforesaid through mechanical media the elements of which include reduction gearing in operative association with additional means for transmitting infinitely variable torque.

A further object of the invention is to transmit power as aforesaid by means of operatively associated elements capable of relative displacement responsive to load variations whereby to achieve an infinitely variable torque instantaneously responsive to variations in load conditions, but normally tending to produce a one-to-one ratio between the rotary movement of the driving and driven members.

A further object of the invention is to provide power transmission means of the character indicated and wherein initial increments of power application are cushioned by the intervention of resilient linkage between the input driving means and the output driving means.

A further object is to provide an automatically operated variable torque transmission in combination with an automatically operated, infinitely variable reduction drive.

A further object of the invention is to provide a transmission of power characterized by the absence of steps or jerks as a result of a perfectly smooth acceleration or deceleration response of the driven shaft.

A further object of the invention is to provide a transmission as defined in the last preceding paragraph, and wherein means is provided for manual modification of the driving effect, both as to the reduction drive and the relative direction of rotation as between the driving and driven shafts.

A further object of the invention is to provide an automatically varying torque transmission, and means in operative association therewith for rotating the driven member in counter rotation relationship to the driving member.

A further object of the invention is to provide transmission means of the character defined in any of the preceding paragraphs which is simple and economical to manufacture and which requires a minimum of mechanical skill to assemble, install, and maintain in operation.

A further object of the invention is to provide an extremely compact assembly of the elements of the transmission, so that there is no wasted space or unnecessary bulk.

Other objects and advantages of the invention will be apparent from a study of the following description of several embodiments of the invention, in conjunction with the accompanying drawings, in which.

Figure 4:
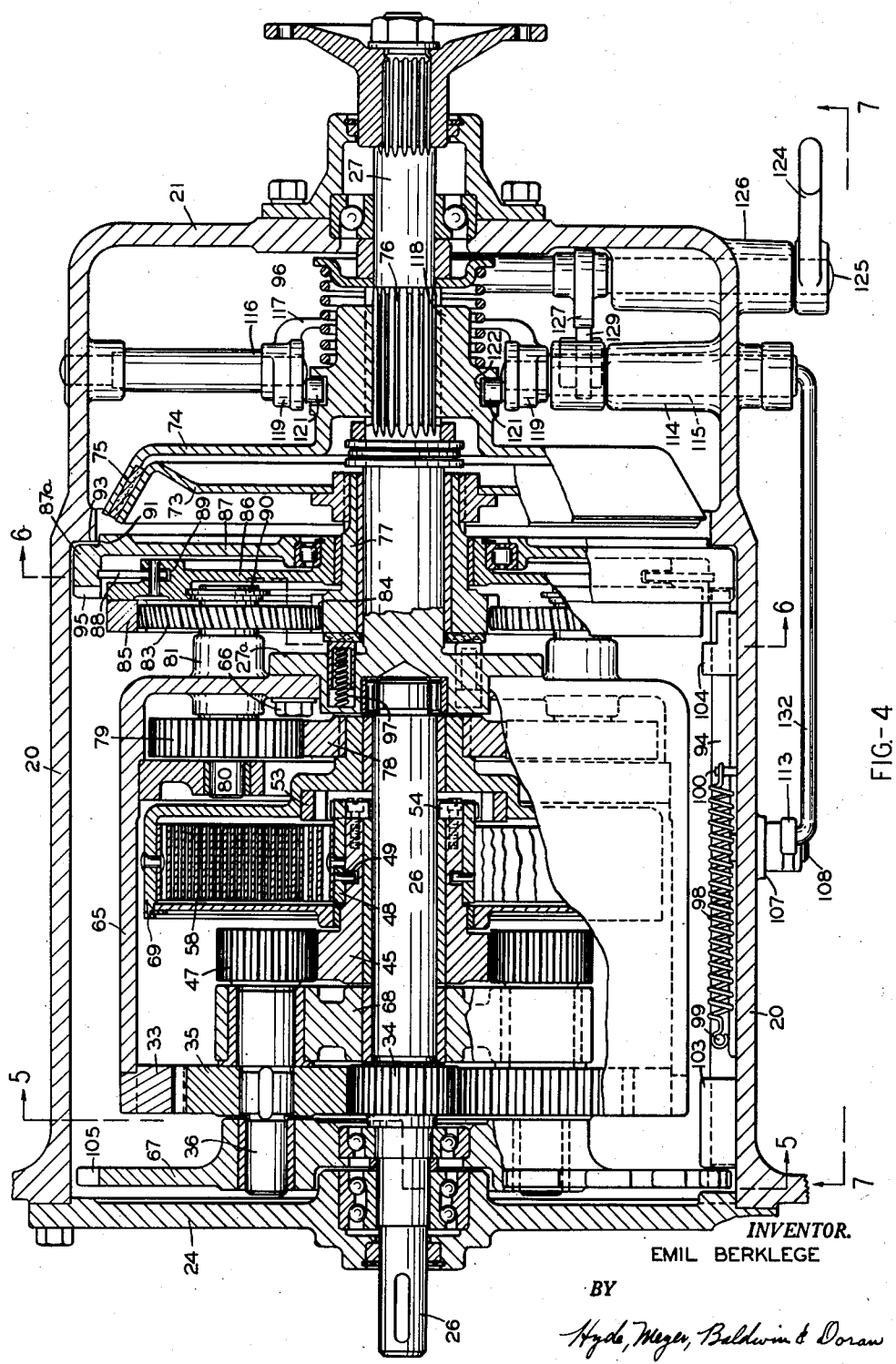
Fig. 4 is a vertical sectional view of another embodiment of my invention.
Figure 6:
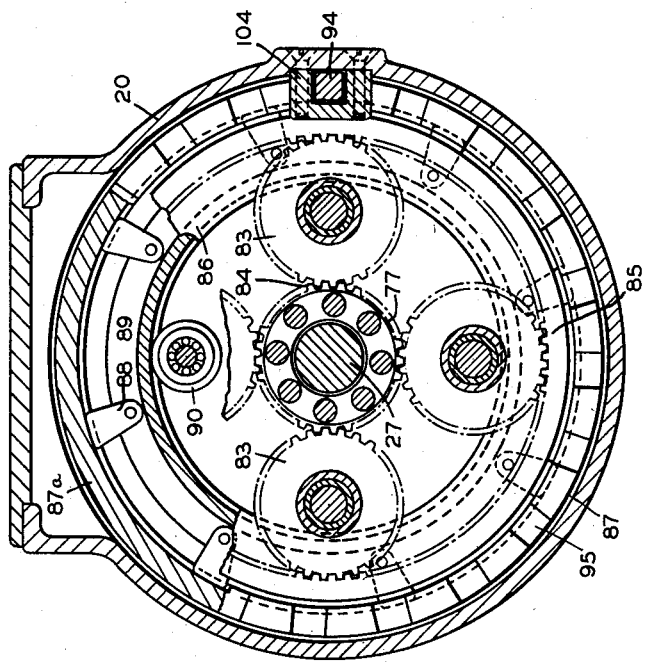
Figure 5:
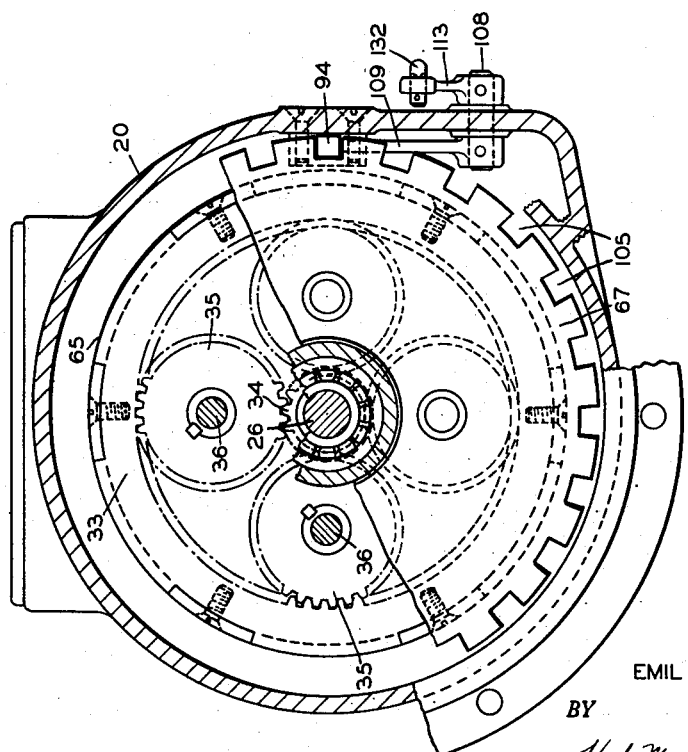

Figs. 5, 6 and 7 are views taken respectively on the lines 5—5, 6—6 and 7—7 of Fig. 4;

Fig. 8 is a view of a fragmentary portion of Fig. 7, the parts being in a somewhat different working position;

Fig. 9 is a sectional view taken on the line 9—9 of Fig. 7; and

Figure 10:
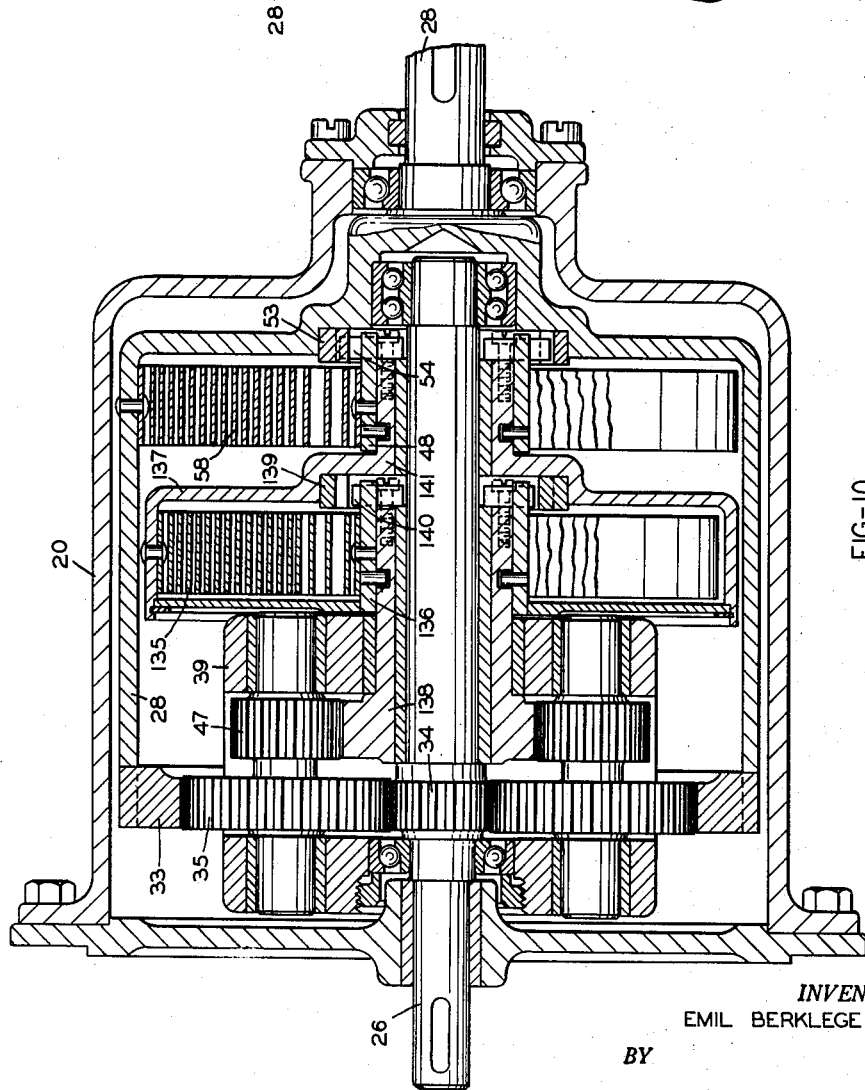

Fig. 10 is a longitudinal sectional view through another embodiment of my invention.

Figure 1:
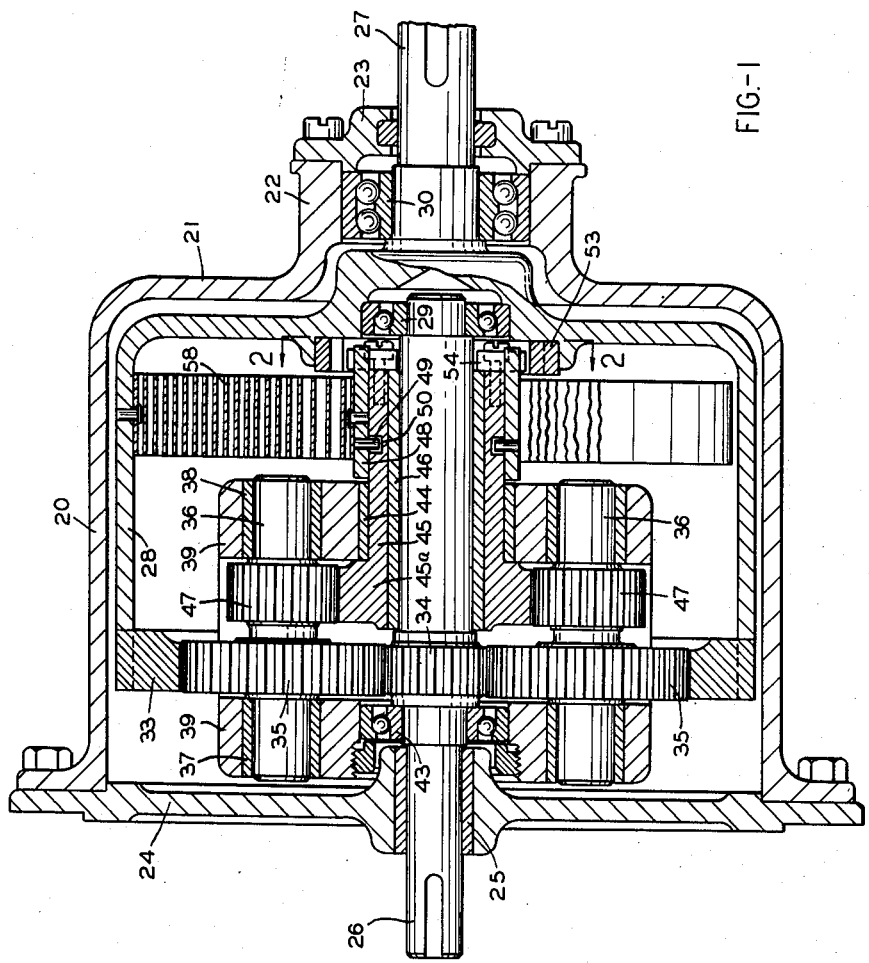
Fig. 1 is a vertical sectional view taken centrally through one embodiment of my transmission substantially on the axis of rotation of the driving and driven shafts.

Referring now to the embodiment of the invention shown in Fig. 1, there is illustrated a stationary housing 20 closed at one end by an integral continuation 21 of the side wall. The end wall 21 is provided with a boss 22 which has a centrally bored cap 23. At its other end the housing is closed by a plate 24 which is likewise provided with an axial aperture in which is a bushing 25. A drive shaft 26 enters through bushing 25, and a driven shaft 27 extends outwardly through cap 23, the drive shaft and driven shaft being in axial alignment. The driven shaft 27 is integral with a drum 28 within housing 20, and having working clearance therefrom. A bearing 29 is disposed in the end wall of drum 28, and the inner end of driving shaft 26 rests in bearing 29. The driven shaft is journaled in bearing 30 in boss 22.

The open end of drum 28 carries an internal ring gear 33. Driving shaft 26 has fixed thereto, or integral therewith, a sun gear 34 in mesh with a spaced series of planet gears 35 which in turn engage the ring 33.

Each planetary gear is fixed on a respective shaft 36 which is journaled, fore and aft, in bushings 37, 38 which are supported in a carrier 39. One end of said carrier is rotatable on a bearing 43 on shaft 26 and the other end on a bushing 44 rotatable on a hub 45, also on shaft 26. Between hub 45 and shaft 26 is a liner or bushing 46. The shaft 36 which carries planetary gear 35, has integral therewith a pinion 47 which is in mesh with gear teeth on the end 45a of hub 45. A sleeve 48 has limited rotative movement on hub 45, as determined by pins 49 fixed in sleeve 48, and extending into segmental slots 50 in hub 45.

A clutch ring 53 is fixed in the end wall of hub 28. A spaced series of pawls 54 (Figs. 1, 2 and 3) are loosely pivotally mounted in the end wall of hub 45 and extend outwardly through notches 55 in sleeve 48 so as to be adapted, during rotation of the hub under certain conditions to move outwardly and engage in the internal grooves or recesses 56 in clutch ring 53. Such conditions are encountered, for example, when the driven shaft becomes the driver, as when the load takes over the drive during deceleration of input power. Such engagement is depicted in Fig. 3, whereas in Fig. 2, during clockwise movement of hub 45 with respect to clutch ring 53, the pawls are cammed inwardly so as to clear the internal teeth 56.

Figure 2:
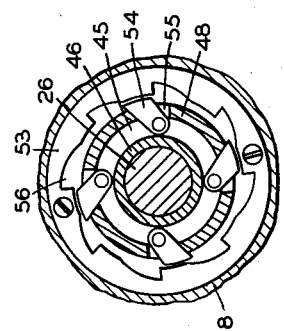
Fig. 2 is a sectional view taken on the line 2—2 of Fig. 1.

It will be apparent then that on clockwise motion of hub 45 with respect to clutch ring 53 (integral with drum 28 and driven shaft 27) the parts will assume the position shown in Fig. 2, whereby such clockwise motion is permitted. It will be further apparent, from a consideration of Fig. 3, that counterclockwise movement of hub 45 with respect to ring 53 produces an interlock by means of pawls 54 so that hub 45 and ring 53 will rotate as a unit. The pawls are urged inwardly by the combined action of the clockwise driving rotation of the hub 45, and the limited loose linkage of the sleeve 48 which lags momentarily in taking up the rotation with the hub 45.

A spiral leaf spring 58 of suitable strength to meet the demand imposed thereon is riveted or otherwise secured at its inner end to sleeve 48 and at its outer end to drum wall 28.

Figure 3:
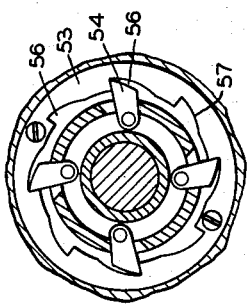
Fig. 3 is a view similar to Fig. 2 but showing the parts in a different working position.

The operation of the device shown in Figs. 1, 2 and 3 is as follows. Assume that shaft 27 operatively engages a load, and must be turned to overcome the inertia of the load. A rotary driving force, whether originating from steam, electricity, an internal combustion engine, or otherwise, is applied to shaft 26. Since drum 28 is integral with shaft 27, its tendency is to remain stationary until sufficient torque is developed. Rotation of shaft 26 rotates sun gear 34 since these parts are integral. Since ring gear 33 is temporarily motionless, and resists initial attempt to move it, the planet gears 35 rotate on sun gear 34, carrying with them their shafts 36, pinions 47, and carrier 39.

Pinions 47 apply to hub 45 a torque which has as its components the meshed engagement between the pinions and the hub, and also the unitary rotation of the whole carrier 39. At first the only resistance to movement of the hub is embodied in the coil spring 58, which is so oriented that driving torque tends to wind it from relaxed condition to greater tension. First increments of motion of the hub engages the pins 49 with the ends of their respective slots, and sleeve 48 then begins to wind the spring imparting leverage through the action of gears 34, 35, 47, 48 which are arranged in a reduction ratio. Pawls 54 are likewise so oriented that they assume the position shown in Fig. 2, whereby they are inactive so far as communicating driving torque to drum 28 is concerned. When spring 58 is wound a torque is developed, causing such tension as to overcome the resistance of the load, driving torque begins to be transmitted to the hub so as to initiate rotation of shaft 27. In steady running the shaft 26 and drum 28 achieve a one-to-one ratio since after the maximum displacement of the parts under a load the parts are automatically adjusted to a condition of equilibrium, provided there is no change in load or input power. The spring readjusts itself to normal tension under such conditions.

The arrangement of the pawls 54, Figs. 2 and 3, protects the spring connection should the driven shaft 27 become the driving shaft in such way as to reverse the direction of relative motion of hub 45 and clutch ring 53, whether by the load overrunning or otherwise. In such case the spring 58 is first relaxed, and then the pawls 54, instead of being cammed out of operative engagement as shown in Fig. 2, are engaged by the internal gear teeth on clutch ring 53, and the drum and hub 45 will rotate as a unit, thereby preventing injury to the spring.

It will be apparent that sudden increases in driving power will have an effect similar to inception of driving torque, and will temporarily be cushioned and relieved through temporary increase in spring tension. Sudden relief in the driving torque, on the other hand will at first tend to cause shaft 27 to overrun, relaxing the spring, and initiating direct drive between shaft 27 and hub 45 as heretofore explained, until a driven one-to-one ratio is again reached.

The combination of the planetary gearing and the coil spring produces an evenly cushioned torque application which has not heretofore been achieved, so far as I am aware. By providing reduction gearing of characteristics predetermined to fit the particular adaptation or need, I have secured a working range of increased leverage in the driving end for overcoming the initial inertia of the load or input power irregularities.

Figs. 4 to 9 inclusive show a further development of my invention wherein I have incorporated therewith an automatically effective reduction drive, and other features now to be described. So far as is possible the reference characters heretofore applied in Figs. 1 to 3 will be applied to identical elements in the succeeding figures. Some of the elements, though functioning similarly to some incorporated in the preceding embodiment, have been changed in shape or otherwise so as to be adapted to new surroundings, and they will be given new reference characters.

In Figs. 4 to 9 the stationary housing 20 is made somewhat larger, but still has an end wall 21, and at its other end a plate closure 24. An inner housing 65 of drum-like form is fixed to the driven shaft 27 by fasteners 66 which pass through the end wall of the drum into a flange 27a of the driven shaft. The inner housing carries the ring gear 33, and the driving shaft 26 has the now familiar sun gear 34, and the planetary gears 35 are on a supported carrier consisting of a front element 67 and a rear element 68, in which elements the planetary gear shafts 36 are journaled. Carrier parts 67 and 68 are rotatable on shaft 26, but, as will later appear, they may under certain conditions be locked with respect to closure plate 24. As in the previous embodiment there is a hub 45 which carries thereon the sleeve 48 with its pins 49. There is a spring drum 69 which in this embodiment is not directly connected to the driven shaft, but, as will appear, it is operatively associated with the driven shaft through gearing to be hereinafter identified.

As part of this gearing, and in the operative linkage between spring drum 69 and the driven shaft 27, there is a member, herewith termed, for convenience in reference, a clutch, and consisting of a pair of engageable elements 73 and 74 which will be termed clutch plates, contactable through a facing member 75. Clutch plate 74 is slidably splined to drive shaft 27 at 76, and is adapted for limited movement therealong, as will appear. Clutch plate 73 is keyed to a hub 77 which is rotatable on shaft 27.

As in the previous embodiment the hub 45 is operatively connected to the spring drum 69 not only through the spring 58, and under certain conditions through pawls 54 engageable with a clutch ring 53.

The gearing further includes a planetary system comprising sun gear 78 on spring drum 69, and a spaced set of planet gears 79 fixedly supported on shafts 80 journaled in bosses 81 in the inner housing drum 65. Likewise fixedly supported on shaft 80, outside of drum 65, are pinions 83 in mesh with a gear wheel on hub 77 heretofore mentioned. The meshed engagement, at 84, is of longitudinally displaceable character by reason of the helical character of the engaging teeth, such displacement taking place under heavy loading on hub 77, as will be more fully explained hereinafter.

Planet pinions 83 are in mesh with an internal ring gear 85 carried on a disk 86 freely rotatable on hub 77, said hub having releasable engagement with a second disk 87. Such engagement will best be understood from a consideration of Figs. 4 and 6. Segmental pieces 88 are pivotally pinned near the periphery of disk 86, in a circumferential groove 89 therein and their tip portion is extendable into an internal peripheral groove in the flange 87a of disk 87. The contour of pieces 88 is such that relative rotation between disks 86 and 87 is permitted in one direction but prevented in the other direction. A dished portion of disk 86 has an inwardly opening groove for the reception of circular plates 90 rotatable on shafts 80. The purpose of the circular plates 90 is to maintain the disk 86 in assembled alignment on the hub 77.

A peripheral shoulder 93 is provided in the stationary housing wall 20 which is complementary to a rabbeted annular groove 91 in the periphery of disk 87.

The rotary drive of shaft 26 and gear 34 is transmitted through the combined action of members 35, 47, 45, and 48 producing increased leverage and imparting it to spring 58. The driving effect thus developed is ultimately transmitted to the driven shaft 27, the forces being simultaneously distributed through the associated rotatable parts. It should be borne in mind that the initial driving effort is concentrated upon driven member 27 at the hubs 81 of the rotary housing 65. This concentration is produced through the rigidity of gears 78, 79, 83, 84, 85, because of the frictional grip of members 73, 74.

Means is provided, in the form of a sliding bar 94, the end of which normally engages recesses 95 in the face of flange 87a, for normally holding disk 87 against rotation.

Assume now that a load of abnormal proportions is effective upon shaft 27, so as to tend to hold shaft 27 and drum 65 against normal driving effort. The spring 58 will then exert greater effort through the leverage resulting from gear action as previously described to turn spring drum 69 and produce consequent rotation of sun gear 78, planet gears 79, shafts 80, and planet gears 83 effective upon hub 77. Hub 77 cannot at the moment rotate by reason of engagement of clutch disk 73 with clutch disk 74, which latter disk is splined to the driven shaft as aforesaid. The torque applied to hub 77 at spiral teeth 84 produces movement of hub 77 to the left against yielding spring 97, thereby disengaging the clutch disks at 75. This permits the hub 77 and disk 73 to rotate freely, and further permits planet gear 83 to rotate, inducing counter-rotation of disk 86. Upon initiation of such counter-rotation, segments 88 jam in their grooves in fixed disk 87, stopping disk 86, and the result is that planet gears 83 run around within ring gear 85, carrying of course their shafts 80 and drum 65 which is integral with the driven shaft, and consequently turning the loaded shaft. The reason the loaded shaft can now be turned is that the new gear contours 78, 79, 83, 85 are freed for rotation under the stress of heavy loads. Even here the drive is influenced by the infinite range of torque securable with this transmission. As the load is taken up and the driven shaft begins to rotate, relief at the point 84 tends to permit hub 77 to move to the right to permit re-engagement of the disks 73, 74, and resumption of normal drive.

I have provided means for reversing the driven shaft, as follows. Reference has been made to a sliding bar or lock bar 94 which is normally biased by a spring 98 towards the right (Fig. 4). The spring is hooked at one end to a projection 99 on the bar, and at its other end to a pin 100 on the housing wall, and the bar slides in bearing blocks 103, and 104 on said wall. Reference was previously made to carrier part 67 which rotated with drum 65 by reason of the fact that shafts 36 are journaled in part 67. It is obvious that if part 67, hereinafter termed a front stop disk, be held with respect to the housing 20, then shafts 36, must maintain a fixed position. The bar 94 is of a length such that when it is moved to the left, its left end interlocks with notches 105 on front stop disk 67 while its right end terminates its engagement with the back stop disk 87. Whereas previously the back stop disk was fixed and the front stop disk rotated, after the bar 94 is shifted to the left the front stop disk is fixed and the back stop disk can rotate. Under such conditions, when the driving shaft 26 is rotated, disk 67 is locked against rotation, and then the sun gear rotation attempts to advance the planetary gear shaft 36, as previously, the shaft 36 cannot advance because disk 67 is locked, and as a result rotation of planetary gears 35 produces counter-rotation of ring gear 33 and drum 65 which is a reverse rotation, communicated directly to driven shaft 27.

Manipulation of sliding bar 94 may be effected as follows. The housing 20 has a bored boss 107 thereon which carries a shaft 108 (Figs. 4 and 7). On the inner end of the shaft is a crank arm 109 the tip of which is inserted between two lugs 110 on bar 94. On the outer end of shaft 108 is a crank arm 113. It is apparent that by rocking the crank arm system the shaft 94 may be reciprocated as desired. This feature will be further explained hereinafter.

Means is provided for manually disengaging clutch disks 73 and 74 for the purpose of putting into effect the reduction drive as previously described. On the inner end of the housing 20 is a boss 114 (Figs. 4 and 9) in which is journaled a stub 115 which is in alignment with a cooperating stub shaft 116 at the opposite side of the housing. Connecting the shafts, and swingable thereon is a roughly semicircular yoke 117 straddling the hub 118 of clutch disk 74. At the ends 119 of the yoke are fingers carrying rollers 121 which are seated loosely in a groove 122 in hub 118. Swinging movement of the bowed portion of the yoke around the shafts 115, 116, applies a leverage through rollers 121 against hub 118 so as to disengage disk 74 against the bias of spring 96, and thereby permit the device to go into reduction gearing.

The yoke 117 and the sliding lock bar 94 are manually controlled by a lever 124 fixed on a shaft 125 which is journaled on a boss 126 on housing 20. On shaft 125, within the housing, are a pair of spaced cams 127 and 128. Cam 127, as will appear, operates lock bar 94, and cam 128 operates yoke 117 to retract clutch plate 74.

Cam 127 engages a roll 129 on the end of a crank lever 130, which is loosely mounted on shaft 115 previously described. Said crank lever 130 is operatively connected to crank lever 113 by a link 132. Rotation of shaft 125 and cam 127 to bring the cam rise against roll 129 swings the two cranks and link 132 to the left (Fig. 7) so as to shift shaft 94 to the left whereby its end enters between the notches on disk 67 and comes to rest in a socket on the closure plate 24

In the meantime cam 128 also rotates with shaft 125, and its raised cam track contacts a roll 133 on yoke 117 so as to swing the yoke and disengage the clutch disk 74. The relative orientation of the two cams is arranged in this embodiment so that the clutch may be disengaged, and so held, without initiating movement of the lock bar. Fig. 8 shows the cam position in which cam 128 has shifted the yoke sufficiently to disengage the clutch, but cam 127 has not yet lifted roll 129 enough to shift the lock lever 94. Control lever 124 may be held in any desired position by any conventional means, not shown, such as by a detent engageable along a segmental track adjacent the lever.

The embodiment of my invention shown in Fig. 10 will now be briefly described. It is similar to Fig. 1 in a number of structural features, and specific attention will be directed only to those features wherein it differs from the embodiment of Fig. 1.

I have already fully explained the operation of shaft 26, sun gear 34, planet gears 35, ring gear 33, planet gear carrier 39, sleeve 48, and spring 58. The same reference characters are here retained, since the structure and function of the parts so identified are identical. Spring 58 is riveted or otherwise attached to housing 28, and driving torque transmitted to spring 58 (in a manner soon to be described) is applied to housing 28 and thence to driven shaft 27 with which said housing 28 is integral. Sleeve 48 and clutch ring 53 are operatively engageable or disengageable through the pawls 54 (Figs. 2 and 3) dependent upon whether the driven shaft becomes the driving member, as in overrunning, as previously described.

In the embodiments so far described the description of the operation of the various moving elements has been based on the assumption that driving torque was applied to the drive shaft in one direction only, namely, in such direction that the spring 58 tends to be wound. In the present embodiment my purpose is to provide means whereby the advantages of the invention may be attained, while permitting drive of shaft 26 in the opposite direction.

Fig. 10 shows the use of a second spiral leaf spring 135 connected to a sleeve 136 at its inner end, and to a drum 137 at its outer end. The springs 135 and 58 are coiled and connected in opposite directions, that is to say one of them progresses outwardly clockwise, and the other counterclockwise, when both are viewed from the same end of the housing 20. The utility of a double spring arrangement is for such applications as those in which the driving member may also be rotated in the opposite direction to drive the driven member in a like opposite direction, providing infinitely variable torque in either direction.

Hub 138 is driven from planet gear 47, and transmits driving torque through sleeve 136 to the spring 135. Hub 138 also is operatively engageable or disengageable with the clutch teeth of the clutch ring 139 through pawls 140 in manner already described in connection with Figs. 2 and 3. The rearward reduced continuation of drum 137 forms hub 141 which drives sleeve 48. The pawls 140 and 54 are mounted in opposite orientations so that, for example, looking from the right end of Fig. 10, if the relative rotary clockwise motion of hub 138 and clutch ring 139 is such as to engage pawls 140 in the internal teeth of clutch ring 139, then relative rotary clockwise motion of hub 141 and gear 153 in the same direction and of the same order is such as to disengage pawls 54. As a result of this structure if a torque applied to driving shaft 26 in one direction is applied to putting tension on spring 135, pawls 140 being disengaged from clutch ring 139, then pawls 54 will engage clutch ring 53 so as to achieve a drive through the spring 135 and later through the planetary gear system 34, 35, 33, to turn drum 137 and shaft 28 in one direction with continuously variable torque. If the torque is applied to shaft 26 in a reverse direction, then pawls 140 engage gear 139 to lock drum 137 to hub 138, and the drive will then be through hub 141, spring 58, and the planetary gear system 34, 35, 33, to turn drum 137 and shaft 28 in the other direction.

In Figs. 1, 4 and 10 I have illustrated power transmission trains whereby power impulses of variable character may be evenly and automatically applied to a load in such manner as to normally achieve equilibrium between the driving shaft and the driven shaft at a one-to-one ratio. In addition, in Fig. 4, I have illustrated further means for automatically introducing a reduction gear drive to the power transmission whenever the load exceeds the normal capacity of the gearing mentioned in the last preceding sentence. This reduction drive is in the power transmission sequence only as long as the load demand requires it. Further, I have shown means for manually introducing the gear reduction, and maintaining it in the power transmission sequence for any desired period, whether or not the load would otherwise require it. I have further shown means for manually reversing the direction of the driven shaft relative to the driving shaft. I have likewise shown means for accommodating the advantages of the above characterized structures to a driving shaft which can be driven in either direction.

I have fully described the structures shown in the drawings. It will be apparent to those skilled in the art that various modifications may be made in the apparatus without departing from the scope of the invention. The gear reduction shown in Fig. 4, for example, may be predetermined to satisfactorily meet the demands of the work anticipated, by inserting a gear train of the proper ratio to take over the reduction drive. The double spring arrangement such as shown in Fig. 10, may be incorporated in Fig. 4 as a substitute for the single spring arrangement. In the embodiment of a transmitter as shown in Fig. 1, the full benefits of the characterized features are obtained in the drive in one direction of rotation. The reversal of the drive shaft 26, Fig. 1, will result in a direct one-to-one reversal of the driven shaft 27 without benefit of the aforesaid features. Similar results are obtained in the reversal of the drive shaft 26 in the more complex transmitter embodied in Fig. 4. Other modifications will occur to those skilled in the art upon consideration of the present specification and drawings.

What I claim is:

1. Power transmission means of the character described comprising axially aligned driving and driven shafts, a sun gear fixed on said driving shaft, a ring gear fixed with respect to said driven shaft and outwardly from said sun gear and in the plane thereof, a plurality of planet gears surrounding said sun gear and in mesh therewith and with said ring gear, and spiral spring means the outer end thereof being fixed with relation to said ring gear, means for operatively linking the inner end of said spring with said sun gear, and said spring being disposed towards coiling motion during preliminary application of driving torque to the driving shaft.

2. Power transmission means of the character defined in claim 1, and wherein complementary clutch parts are provided, means for operatively connecting one such part with said drive shaft and other means for operatively connecting the other such part with the inner end of said spring, said parts being mutually disengageable during normal forward drive, but being engageable to prevent damaging uncoiling movement of said spring during overrunning or reversal of said driven shaft.

3. Power transmission means of the character described comprising axially aligned driving and driven shafts, a sun gear fixed on said driving shaft, said driven shaft having a drum-like extension with an annular flange surrounding a portion of said driving shaft radially outwardly from said sun gear, a ring gear fixed on the inner periphery of said flange, a plurality of planet gears surrounding said sun gear and in mesh therewith and with said ring gear, a spiral spring having the outer end thereof fixed to said flange, means for operatively connecting the inner end of said spiral spring with said sun gear, said spring being disposed towards coiling motion during preliminary application of driving torque to the driving shaft.

4. Power transmission means of the character defined in claim 3, and wherein complementary clutch parts are provided, one such part being fixed to move with said drum-like extension, and the other such part being movable with the inner end of said spring; said parts being mutually disengageable during normal forward drive, but being engageable to prevent damaging uncoiling movement of said spring during overrunning of said driven shaft.

5. Power transmission means of the character described comprising axially aligned driving and driven shafts, a planet gear shaft spaced radially outwardly from said driving shaft, and parallel thereto, a ring gear spaced radially outwardly from said driving shaft and beyond said planet gear shaft, a drum fixed to said driven shaft and to said ring gear, a sun gear on said driving shaft, a planet gear on said planet gear shaft in mesh with said sun gear and said ring gear, a hub freely rotatably mounted on said driving shaft, said hub having peripheral gear teeth near one end thereof, a pinion fixed to said planet gear shaft and in mesh with said peripheral gear teeth, a sleeve mounted and attached with a lost motion connection to the other end of said hub, a spiral spring surrounding said sleeve and having an inner end fixed to said sleeve and an outer end to said drum so as to be operatively effective upon said driven shaft, said spring being adapted for preliminary coiling movement responsive to movement of said driving shaft so as to progressively apply increasing driving torque to move said driven shaft, and said sun gear, planet gears, and ring gear being likewise adapted to progressively apply increasing driving torque to move said driven shaft in stepless manner.

6. Power transmission means of the character defined in claim 5 and wherein complementary clutch parts are provided, means for operatively connecting one such part with one end of said spring, the other such part being fixed to move with the said hub, said parts being mutually disengageable during normal forward drive, but being engageable to prevent damaging uncoiling movement of said spring during overrunning of said driven shaft.

7. Power transmission means of the character described comprising axially aligned driving and driven shafts, a planet gear shaft spaced radially outwardly from said driving shaft, a ring gear spaced radially outwardly from said driving shaft and beyond said planet gear shaft, a sun gear on said driving shaft, a planet gear on said planet gear shaft in mesh with said sun gear and said ring gear, a hub freely rotatably mounted on said driving shaft, said hub having peripheral gear teeth near one end thereof, a pinion fixed to said planet gear shaft and in mesh with said peripheral gear teeth, a sleeve mounted on said hub and attached to rotate with lost motion thereon, a drum freely mounted on said driving shaft surrounding said sleeve, said ring gear being fixed to said drum, a spiral spring having its inner end fixed to said sleeve and its outer end fixed to said drum, said drum being provided with a central bored extension a sleeve mounted on said extension and attached to rotate with lost motion thereon, a second spiral spring having its inner end fixed to said sleeve means for operatively connecting the outer end of said second spiral spring and the driven shaft, said springs being so disposed that they coil and uncoil in opposite directions, each such spring being provided with complementary clutch members disposed to move with respect to each other only in one direction, whereby on motion of the driving shaft in one direction the first said spring tends to coil while the respective clutch means on the second said spring prevents uncoiling movement thereof, and on motion of the driving shaft in the other direction the second said spring tends to coil while the respective clutch means on the first said spring prevents uncoiling movement thereof, each said spring being adapted, during driving movement in its respective coiling direction, to progressively apply increasing driving torque to move said driven shaft, and said sun gear, planet gear, and ring gear being likewise adapted to take up the drive and progressively apply increasing driving torque to move said driven shaft in stepless manner.

8. Power transmission means of the character described comprising axially aligned driving and driven shafts, a planet gear shaft spaced radially outward from said driving shaft, and parallel thereto, a ring gear spaced radially outwardly from said driving shaft beyond said planet gear shaft and fixed to said driven shaft, a sun gear on said driving shaft, a planet gear on said planet gear shaft in mesh with said sun gear and said ring gear, a hub freely rotatably mounted on said driving shaft, said hub having peripheral gear teeth near one end thereof, a pinion fixed to said planet gear shaft and in mesh with said peripheral gear teeth, a sleeve mounted and attached with a lost motion connection to the other end of said hub, a spiral spring surrounding said sleeve and having an inner end fixed to said sleeve, said spring being adapted for preliminary coiling movement responsive to movement of said driving shaft, a drum freely rotatable on the driving shaft the outer end of said spring being fixed to said drum, said drum being provided with a bored boss having a second sun gear thereon, a second hub freely rotatable on said driven shaft and having a third sun gear thereon, a second planet gear shaft spaced radially outwardly from the adjacent ends of said driving and driven shafts and having spaced second and third planet gears thereon in mesh respectively with said second and third sun gears, said second planet gear shaft being mounted to revolve in an orbit around and fixed with said driven shaft, a second internal ring gear in mesh with said third planet gear, means for holding said second ring gear stationary, a first friction member fixed on said second hub, a second friction member splined on said driven shaft and engageable with said first friction member, and means responsive to loads on said driven shaft exceeding a predetermined amount for separating said friction members.

9. Power transmission means of the character defined in claim 8, and wherein manually operatable means is provided for separating said friction members.

10. Power transmission means of the character defined in claim 8, and wherein means is provided for preventing damaging uncoiling movement of said spring during overrunning of said driven shaft.

11. Power transmission means of the character described comprising axially aligned driving and driven shafts, a sun gear fixed on said driving shaft, a ring gear, means for operatively connecting said ring gear with respect to said driven shaft and outwardly from said sun gear, a plurality of planet gears surrounding said sun gear and in mesh therewith and with said ring gear, and spiral spring means, the outer end thereof being fixed with relation to said ring gear means for operatively connecting the inner end of said spring with said sun gear, said spring being disposed towards coiling motion during preliminary application of driving torque to the driving shaft.

12. Power transmission means of the character described comprising axially aligned driving and driven shafts, a planet gear shaft spaced radially outward from said driving shaft, and parallel thereto, a ring gear spaced radially outwardly from said driving shaft beyond said planet gear shaft and fixed to said driven shaft, a sun gear on said driving shaft, a planet gear on said planet gear shaft in mesh with said sun gear and said ring gear, a hub freely rotatably mounted on said driving shaft, said hub having peripheral gear teeth near one end thereof, a pinion fixed to said planet gear shaft and in mesh with said peripheral gear teeth, a sleeve mounted and attached with lost motion on the other end of said hub, a spiral spring surrounding said sleeve and having an inner end fixed to said sleeve, said spring being adapted for preliminary coiling movement responsive to movement of said driving shaft, a drum freely rotatable on the driving shaft the outer end of said spring being fixed to said drum, said drum being provided with a bored boss having a second sun gear thereon, a second hub freely rotatable on said driven shaft and having a third sun gear thereon, a second planet gear shaft spaced radially outwardly from the adjacent ends of said driving and driven shafts and having spaced second and third planet gears thereon in mesh respectively with said second and third sun gears, the meshed engagement between said third planet gear and said third sun gear being through spiral gear teeth of the type disposed towards endwise displacement under heavy load, said second planet gear shaft being mounted to revolve in an orbit around and fixed with said driven shaft, a second internal ring gear in mesh with said third planet gears, means for holding said second ring gear stationary, a first friction member fixed on said second hub, a second friction member splined on said driven shaft and engageable with said first friction member, said friction members being separatable by endwise movement of said second hub upon application of a heavy load to said spiral gear teeth as aforesaid.

13. Power transmission means of the type defined in claim 12, wherein spring means is provided effective upon said second friction member to normally tend to maintain it in contact with said first friction member, said second member being movable endwise in its splined connection to said driven shaft, and manually operatable leverage operatively engageable with said second friction member against the bias of said last named spring means to disengage said first and second friction members when said leverage is operated.

14. Power transmission means of the character described comprising a fixed housing, axially aligned driving and driven shafts journaled in opposed walls of said housing and extending therewithin, a planet gear shaft within said housing and spaced radially outwardly from said driving shaft, and parallel thereto, a ring gear spaced radially outwardly from said driving shaft beyond said planet gear shaft and fixed to said driven shaft, a sun gear on said driving shaft, a planet gear on said planet gear shaft in mesh with said sun gear and said ring gear, a hub freely rotatably mounted on said driving shaft, said hub having peripheral gear teeth near one end thereof, a pinion fixed to said planet gear shaft and in mesh with said peripheral gear teeth, a sleeve mounted and attached with lost motion on the other end of said hub, a spiral spring surrounding said sleeve and having an inner end fixed to said sleeve, said spring being adapted for preliminary coiling movement responsive to movement of said driving shaft, a drum freely rotatable on the driving shaft, the outer end of said spring being fixed to said drum, said drum being provided with a bored boss having a second sun gear thereon, a second hub freely rotatable on said driven shaft and having a third sun gear thereon, a second planet gear shaft spaced radially outwardly from the adjacent ends of said driving and driven shafts and having spaced second and third planet gears fixed thereon and in mesh respectively with said second and third sun gears, said second planet gear shaft being mounted to revolve in an orbit around and fixed with respect to said driven shaft, a second internal ring gear in mesh with said third planet gear, a first friction member fixed on said second hub, a second friction member splined on said driven shaft and engageable with said first friction member, a first stop member rotatable around the driving shaft and having a portion of said first planet gear shaft seated therein, a second stop member rotatable around the driven shaft and being fixable with relation to said second internal ring gear during movement of said second internal ring gear in one direction only, and reversing means carried on said housing and adapted, by movement thereof, to prevent rotation of said first stop member when said reversing means is moved in one direction, and to prevent rotation of said second stop member when said reversing means is moved in the other direction, so as respectively to produce reverse rotation or forward rotation of said driven shaft.

15. Power transmission means of the type defined in claim 14 and wherein spring biasing means is provided normally urging said reversing member to a position causing forward rotation of said driving shaft.

16. Power transmission means of the type defined in claim 14 and wherein means is provided for automatically separating said friction member when the load on said driving shaft exceeds a critical value.

17. Power transmission means of the type defined in claim 14 wherein means is provided for automatically separating said friction members when the load on said driving shaft exceeds a critical value, and wherein further means is provided for manually separating said members prior to movement of said reversing member.

18. A planetary reduction gearing comprising axially aligned driving and driven shafts, a sun gear fixed on said driving shaft, a ring gear fixed with respect to said driven shaft and outwardly from said sun gear and in the plane thereof, a drum fixed to said driven shaft and to said ring gear, a plurality of planet gear shafts surrounding said sun gear, a plurality of planet gears, each on a respective planet gear shaft, and each planet gear in mesh simultaneously with said sun gear and with said ring gear, spiral spring means, means for operatively connecting the outer end of said spring means with said drum, other means for operatively linking the inner end of said spring with said sun gear, said spring being disposed towards coiling motion during preliminary application of driving torque to the driving shaft.

EMIL BERKLEGE.

References Cited in the file of this patent

UNITED STATES PATENTS

| Number | Name | Date |
|---|---|---|
| 1,997,503 | Wheeler | Apr. 9, 1935 |
| 2,031,247 | Bischof | Feb. 18, 1936 |